(12) United States Patent
Edquist

(10) Patent No.: US 10,894,614 B1
(45) Date of Patent: Jan. 19, 2021

(54) HALO LIGHT ASSEMBLY

(71) Applicant: B/E AEROSPACE, INC., Winston Salem, NC (US)

(72) Inventor: John Edquist, Milwaukee, WI (US)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 16/746,280

(22) Filed: Jan. 17, 2020

(51) Int. Cl.
| | |
|---|---|
| *B64D 47/04* | (2006.01) |
| *F21S 41/19* | (2018.01) |
| *F21S 41/151* | (2018.01) |
| *F21Y 115/10* | (2016.01) |
| *F21W 107/30* | (2018.01) |

(52) U.S. Cl.
CPC ............ *B64D 47/04* (2013.01); *F21S 41/151* (2018.01); *F21S 41/19* (2018.01); *B64D 2203/00* (2013.01); *F21W 2107/30* (2018.01); *F21Y 2115/10* (2016.08)

(58) Field of Classification Search
CPC ..... B64D 47/04; B64D 2203/00; F21S 41/19; F21S 41/151; F21W 2107/30
See application file for complete search history.

(56) References Cited

U.S. PATENT DOCUMENTS

| | | | |
|---|---|---|---|
| 6,092,915 A | 7/2000 | Rensch | |
| 6,526,681 B1 * | 3/2003 | De Saro | G09F 13/04 40/564 |
| 9,772,439 B2 * | 9/2017 | Montgomery | G02B 6/0055 |
| 2003/0021917 A1 | 1/2003 | Hotaka et al. | |
| 2007/0006493 A1 | 1/2007 | Eberwein | |
| 2011/0134623 A1 | 6/2011 | Sherman et al. | |
| 2012/0320621 A1 | 12/2012 | Kleo et al. | |
| 2015/0085488 A1 * | 3/2015 | Grote, III | B60Q 3/233 362/249.02 |
| 2016/0085012 A1 * | 3/2016 | Pfau | G06F 3/03547 362/551 |

FOREIGN PATENT DOCUMENTS

| | | | |
|---|---|---|---|
| CN | 102720971 A | * 10/2012 | |
| CN | 202733542 U | * 2/2013 | |
| JP | 2008023922 | 2/2008 | |
| WO | WO-2004114342 A1 | * 12/2004 | H01H 9/182 |

* cited by examiner

*Primary Examiner* — Mariceli Santiago
(74) *Attorney, Agent, or Firm* — Snell & Wilmer L.L.P.

(57) ABSTRACT

A halo light assembly may comprise a laminate transparency and a light source disposed around the laminate transparency. The laminate transparency may comprise a diffusion layer disposed on an internal surface of the laminate transparency. The light source may be disposed adjacent to, and oriented towards, the laminate transparency. The light source may be configured to emit light into the laminate transparency and reflect the light off of the diffusion layer and/or provide a halo effect.

18 Claims, 6 Drawing Sheets

Section B-B

Section A-A

Section B-B

Section B-B

HALO LIGHT ASSEMBLY

FIELD

The present disclosure relates to aircraft lighting systems, and, more specifically, to aircraft light assembly with halo lighting.

BACKGROUND

Aircraft often have one or more light assemblies configured to allow a pilot to see a landing area, to allow a pilot to see during taxi, or the like. Various manufacturers desire different light assemblies for their aircraft lighting systems for brand recognition, or the like.

SUMMARY

A halo light assembly is disclosed herein. The halo light assembly may comprise: a bevel including an aperture defining an inner surface; a laminate transparency coupled to the bevel, the laminate transparency disposed in the aperture, the laminate transparency configured to abut the bevel, the laminate transparency including an internal surface, an external surface, and a diffusion layer, the diffusion layer disposed on the internal surface of the laminate transparency; and a light source coupled to the bevel and disposed adjacent to the laminate transparency, the light source extending around a perimeter of the laminate transparency, the light source oriented inward toward the laminate transparency.

In various embodiments, the light source may comprise a flexible strip and a plurality of lights. The plurality of lights may be embedded in the flexible strip. The laminate transparency may further comprise a first laminate layer and a second laminate layer, the second laminate layer disposed between the diffusion layer and the first laminate layer. A second index of refraction of the second laminate layer may be greater than a first index of refraction of the first laminate layer. The light source may be oriented towards the second laminate layer. The halo light assembly may further comprise a main light source, wherein the second laminate layer is disposed between the first laminate layer and the main light source. The diffusion layer may extend from an outer edge of the internal surface of the laminate transparency inward on the internal surface. The diffusion layer may extend around a perimeter of the halo light assembly on the internal surface of the laminate transparency.

An aircraft is disclosed herein. The aircraft may comprise: a fuselage; a wing extending from the fuselage; a halo light assembly disposed on at least one of the fuselage or the wing, the halo light assembly comprising: a bevel including an aperture defining an inner surface; a laminate transparency coupled to the bevel, the laminate transparency disposed in the aperture, the laminate transparency including an internal surface, an external surface, and a diffusion layer, the diffusion layer disposed on the internal surface of the laminate transparency; a main light source disposed internal to the laminate transparency; and a secondary light source coupled to the bevel and disposed adjacent to the laminate transparency, the secondary light source configured to produce a halo effect in the halo light assembly.

In various embodiments, the secondary light source may extend around a perimeter of the laminate transparency, the secondary light source oriented inward toward the laminate transparency. The secondary light source may comprise a flexible strip and a plurality of lights. The plurality of lights may be embedded in the flexible strip. The diffusion layer may comprise at least one of a textured surface or a diffusion paint. The laminate transparency may further comprise a first laminate layer and a second laminate layer, the second laminate layer disposed between the diffusion layer and the first laminate layer. A second index of refraction of the second laminate layer may be greater than a first index of refraction of the first laminate layer. The secondary light source may be oriented towards the second laminate layer. The second laminate layer may be disposed between the first laminate layer and the main light source.

A method of producing a halo effect for a halo light assembly is disclosed herein. The method may comprise: emitting a light inward towards a laminate transparency, the laminate transparency comprising a diffusion layer disposed on an internal surface of the laminate transparency; reflecting the light off the diffusion layer; and deflecting the light external to the halo light assembly.

The laminate transparency may comprise a first laminate layer and a second laminate layer, the second laminate layer disposed between the diffusion layer and the first laminate layer, and wherein the emitting the light further comprises emitting the light towards the second laminate layer.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. As used herein, "forward" refers to the direction associated with a nose (e.g., the front end) of the aircraft, or generally, to the direction of flight or motion.

Figure 1:
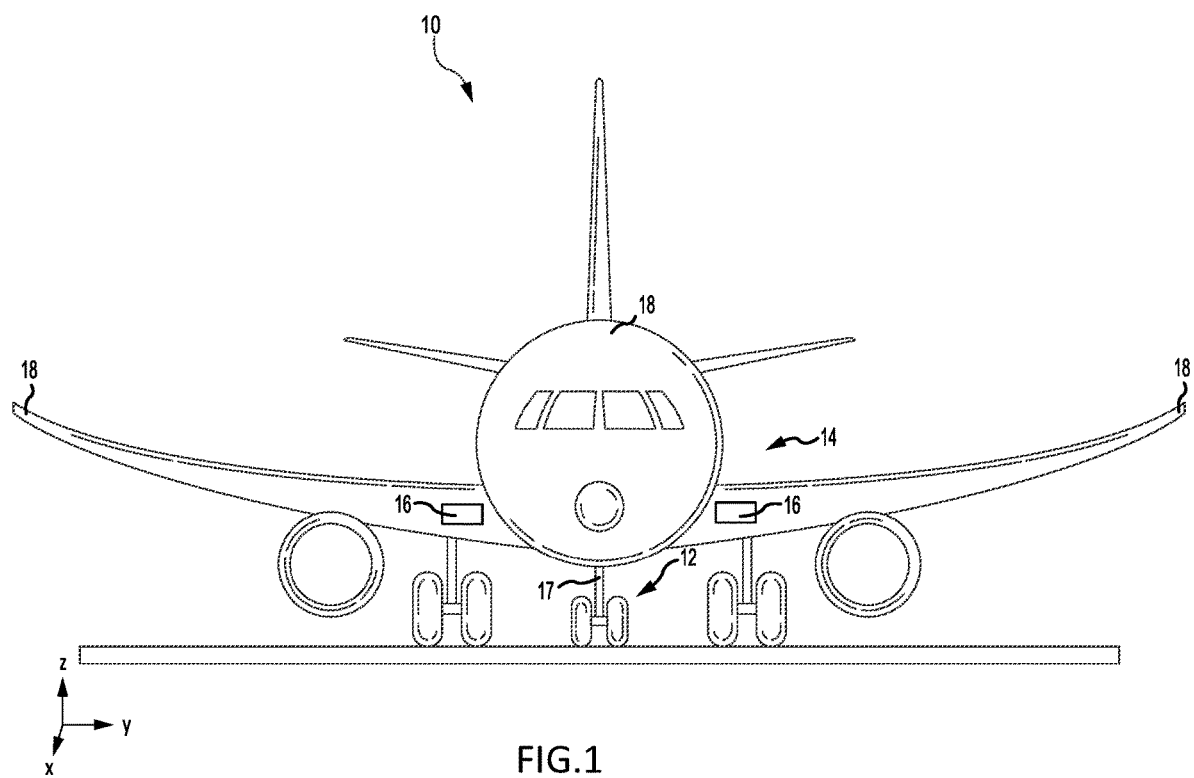
FIG. 1 illustrates an aircraft, in accordance with various embodiments.

With reference to FIG. 1, an aircraft 10 in accordance with various embodiments may comprise aircraft systems, for example, one or more landing gear such as landing gear 12, which may generally support aircraft 10 when aircraft is not flying, allowing aircraft 10 to taxi, take off, and land without damage. Aircraft 10 may include one or more exterior lamps 14 such as, for example, landing lights 16, taxi lights 17, and navigation lights 18. Aircraft 10 may include any number of other exterior lamps 14 such as logo lights, runway turnoff lights, engine scan lights, anti-collision lights, strobe lights, beacon lights, cargo compartment lights, obstruction lights, landing gear lights, and/or the like.

Figure 2:
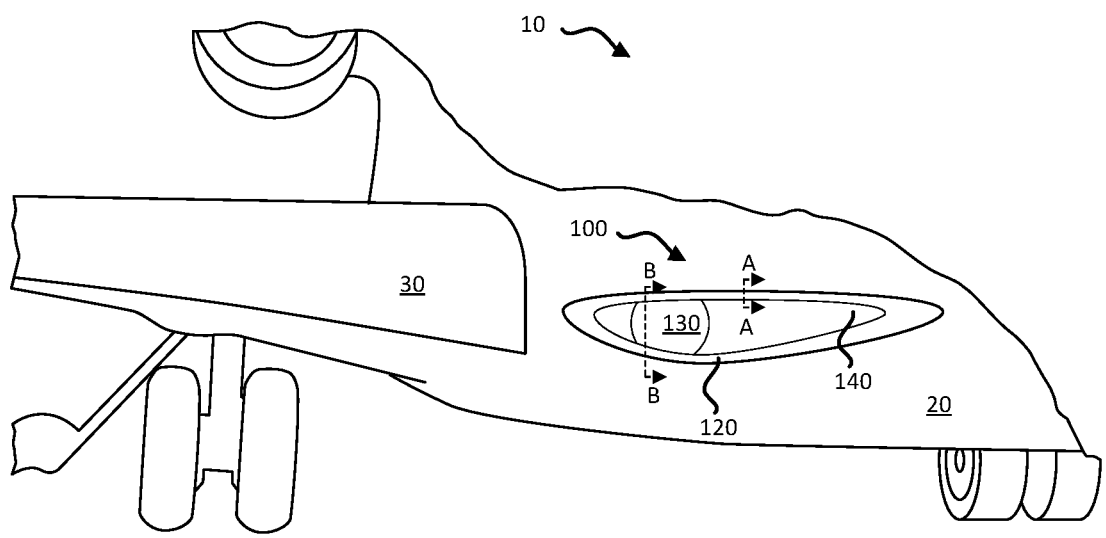
FIG. 2 illustrates a perspective view of a portion of aircraft, in accordance with various embodiments.

With reference now to FIG. 2, a perspective view of a portion of aircraft 10, in accordance with various embodiments, is illustrated. Aircraft 10 may include a halo light assembly 100 disposed on fuselage 20 proximate a wing 30. Although illustrated at fuselage 20 proximate wing 30, the halo light assembly 100 may be disposed in any location on aircraft 10 (e.g., exterior lamps 14 locations from FIG. 1). The halo light assembly 100 may comprise a halo portion 120 and a main light portion 130. The halo portion 120 may be configured to provide a halo effect of the halo light assembly 100. A "halo effect," as disclosed herein refers to a glow (i.e., light emission, reflection, refraction or dispersion) disposed around or substantially around a perimeter of the halo light assembly 100. The halo portion 120 and the main light portion 130 may be enclosed by a laminate transparency 140. The laminate transparency 140 may comprise any material known in the art, such as poly (methyl methacrylate) ("PMMA"), or the like.

Figure 3:
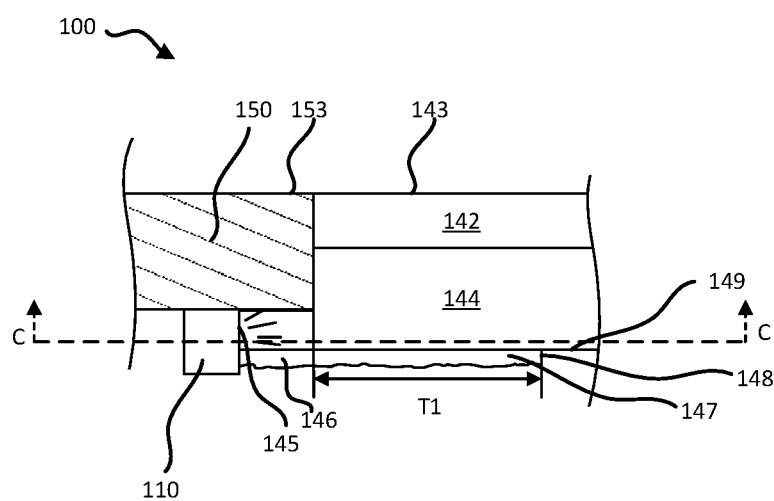
FIG. 3 illustrates a cross-section A-A of a portion of halo light assembly from FIG. 2, in accordance with various embodiments.

Referring now to FIG. 3, a cross-section A-A of a portion of halo light assembly 100 is illustrated, in accordance with various embodiments. The halo light assembly 100 may comprise a secondary light source 110 and a bevel 150. The secondary light source 110 may be coupled to the bevel 150 by any method known in the art, such as fasteners, adhesives, or the like. In various embodiments, the secondary light source 110 be embedded in bevel 150. The secondary light source 110 may be directed towards the laminate transparency 140. The secondary light source 110 may be configured to illuminate an area forward of aircraft 10. The secondary light source 110 may be configured to create a halo effect for the halo portion 120 (from FIG. 2) of the halo light assembly 100. The secondary light source 110 may be any light source known in the art, such as a light emitting diode (LED), or the like.

In various embodiments, the laminate transparency 140 comprises a first laminate layer 142 disposed adjacent to bevel 150. In various embodiments, bevel 150 may be coupled to fuselage 20 and/or wing 30 from FIG. 2. In various embodiments, bevel 150 may be integral to fuselage 20 and/or wing 30 from FIG. 2. "Integral," as referred to herein refers to a monolithic component (i.e., a component manufactured out of a single material). First laminate layer 142 may include an external surface 143 exposed to an external environment (e.g., atmosphere, or the like). External surface 143 may be disposed adjacent to a bevel external surface 153. The laminate transparency 140 may further comprise a second laminate later 144 disposed inward from first laminate later 142. The laminate transparency 140 may further comprise a diffusion layer 146. The diffusion layer 146 may be disposed on an internal surface 149 of the second laminate layer 144.

In various embodiments, the diffusion layer 146 may comprise a diffusion paint, a textured surface, or the like. A textured surface may comprise a rough finish of an internal surface of second laminate layer 144. A diffusion paint may include a white matte paint, white gloss paint, an opaque pain (white or colored depending on desired effect), a particular unique pattern such that it illuminates this pattern so it is visible from a distance at night (rather than a solid stripe), or the like. The diffusion paint may be configured to reflect some light and/or diffuse some light. The diffusion layer 146 may be configured to reflect light emitted from the secondary light source 110 outward towards external surface 143 of the first laminate layer 142. The diffusion layer 146 may be configured to provide a halo effect at the halo portion 120 from FIG. 1. In various embodiments, a thickness T1 of the halo portion 120 may correspond to a first portion 147 of diffusion layer 146 disposed opposite external surface 143 of the first laminate layer 142. In various embodiments, the diffusion layer 146 may be disposed at any location on an internal surface of second laminate layer 144 where a halo effect is desired.

In various embodiments, the first laminate layer 142 may comprise any laminate transparency known in the art. In various embodiments, the first laminate layer 142 comprises PMMA. The second laminate layer 144 may also comprise any laminate transparency known in the art. In various embodiments, the second laminate layer 144 comprise polycarbonate, or the like. The second laminate layer 144 may be configured to act as a light pipe. The first laminate layer 142 may be configured for abrasion resistance. The second laminate layer 144 may be configured for impact resistance. For example, first laminate layer 142 may comprise a first index of refraction and second laminate layer 144 may comprise a second index of refraction. The second index of refraction of the second laminate layer 144 may be greater than a first index of refraction of the first laminate layer 142. In various embodiments, the halo light assembly 100 may be configured not to illuminate any abrasion on external surface 143 due to the difference in the index of refraction.

Although illustrated with a first laminate layer 142 and a second laminate layer 144, one skilled in the art would recognize that the first laminate layer 142 and the second laminate layer 144 may comprise a single laminate layer (e.g., a PMMA layer, a polycarbonate layer, or the like).

Figure 4:
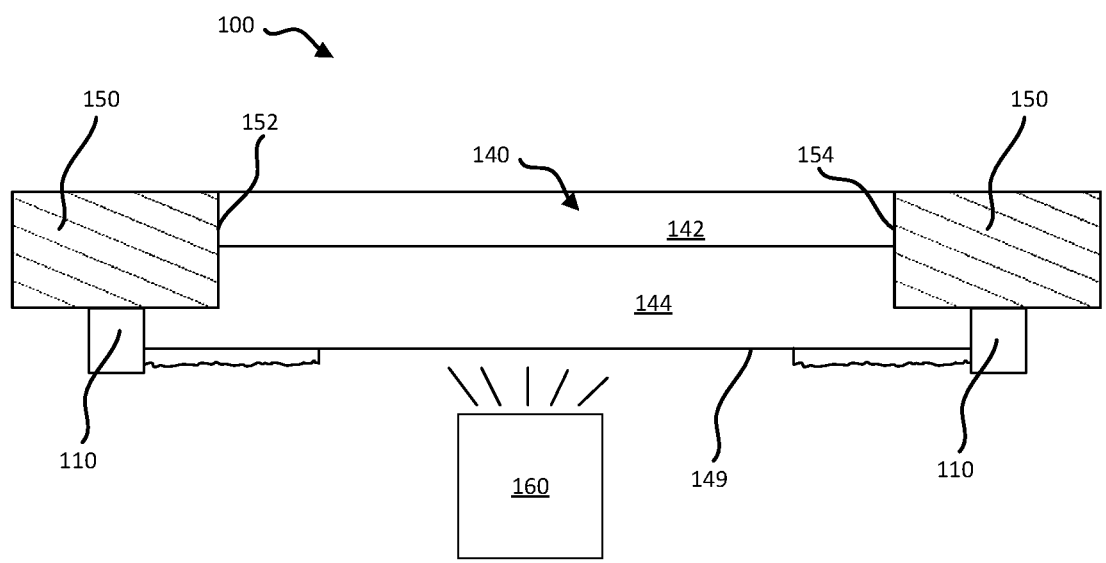
FIG. 4 illustrates a cross-section B-B of section of a portion of halo light assembly of FIG. 2, in accordance with various embodiments.

In various embodiments, secondary light source 110 extends around a perimeter of an adjacent outward surface 145 of second laminate layer 144. With reference now to FIG. 4, a cross-section of section B-B of FIG. 2 is illustrated, in accordance with various embodiments. In various embodiments, the laminate transparency 140 is surrounded by and enclosed by the bevel 150. The bevel may comprise any material known in the art, such as aluminum or the like. The halo light assembly 100 may further comprise a main light source 160 disposed inward to secondary light source 110. The main light source 160 may comprise any light source known in the art, such as an LED, or the like. The main light source 160 may be disposed adjacent to the second laminate layer 144. The second laminate layer 144 may be disposed between the first laminate layer 142 and the main light source 160. The main light source may further be directed towards an internal surface 149 of second laminate layer 144. In various embodiments, internal surface 149 may be a non-diffusion layer. In various embodiments, the main light source 160 may be configured to emit light forward of aircraft 10 from FIG. 1 through the first laminate layer 142 and the second laminate layer 144.

In various embodiments, the bevel 150 may define an aperture 152 disposed therein. The laminate transparency 140 may be disposed within the aperture 152. The aperture 152 may define an inner surface 154. The laminate transparency 140 may abut the inner surface 154 of the aperture 152.

Figure 5:
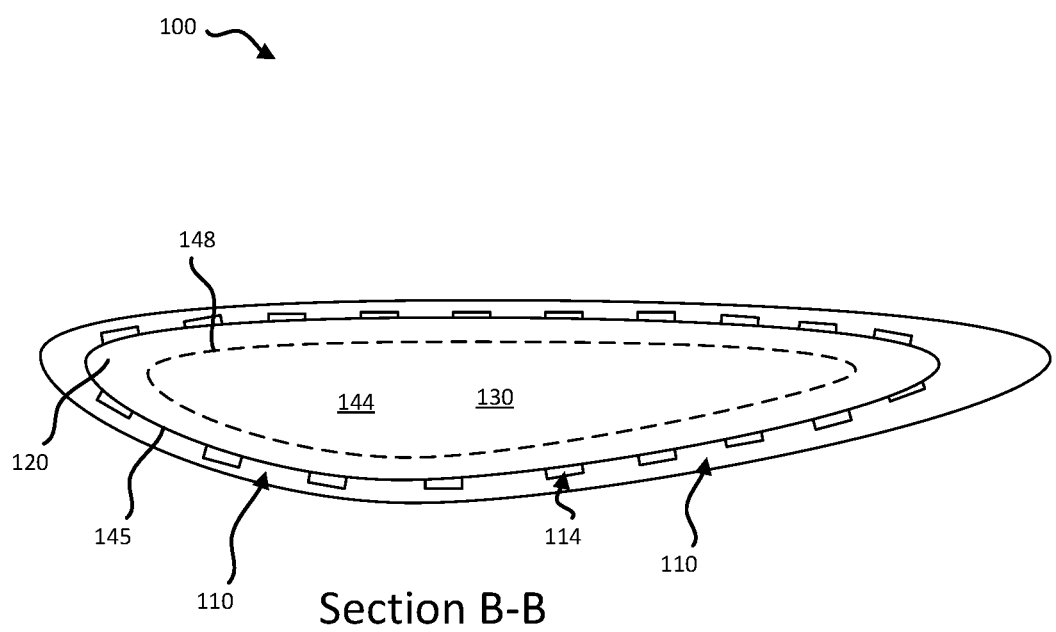
FIG. 5 illustrates a cross-section of section C-C of section of a portion of halo light assembly of FIG. 2, in accordance with various embodiments.

With reference now to FIG. 5, a cross-section of section C-C of FIG. 3 is illustrated, in accordance with various embodiments. In various embodiments, secondary light source 110 extends around an entire perimeter of second laminate layer 144. The secondary light source 110 may comprise a flexible strip 112 extending completely around the outward surface 145 of second laminate layer 144. The secondary light source 110 may further comprise a plurality of lights 114 (e.g., LED lights) embedded in the flexible strip 112. Each light in the plurality of lights 114 may be disposed proximate the outward surface 145 of second laminate layer 144. Each light in the plurality of lights 114 may be oriented inward toward the outward surface 145 of second laminate layer. Each light in the plurality of lights 114 may be configured to emit light into the second laminate layer 144. In various embodiments, the flexible strip 112 may comprise any material known in the art, such as plastic, or the like.

With combined reference now to FIGS. 3 and 4, an inward edge 148 of diffusion layer 146 may partially define the thickness T1 of halo portion 120. Inward edge 148 is shown as a hidden line in FIG. 4 as inward edge would be disposed behind second laminate layer 144 along section line C-C. The diffusion layer 146 may reflect light toward external surface 143 and partially define halo portion 120. As light extends further inward, main light portion 130 may be configured to illuminate an area external to external surface 143 of the first laminate layer 142.

Figure 6:
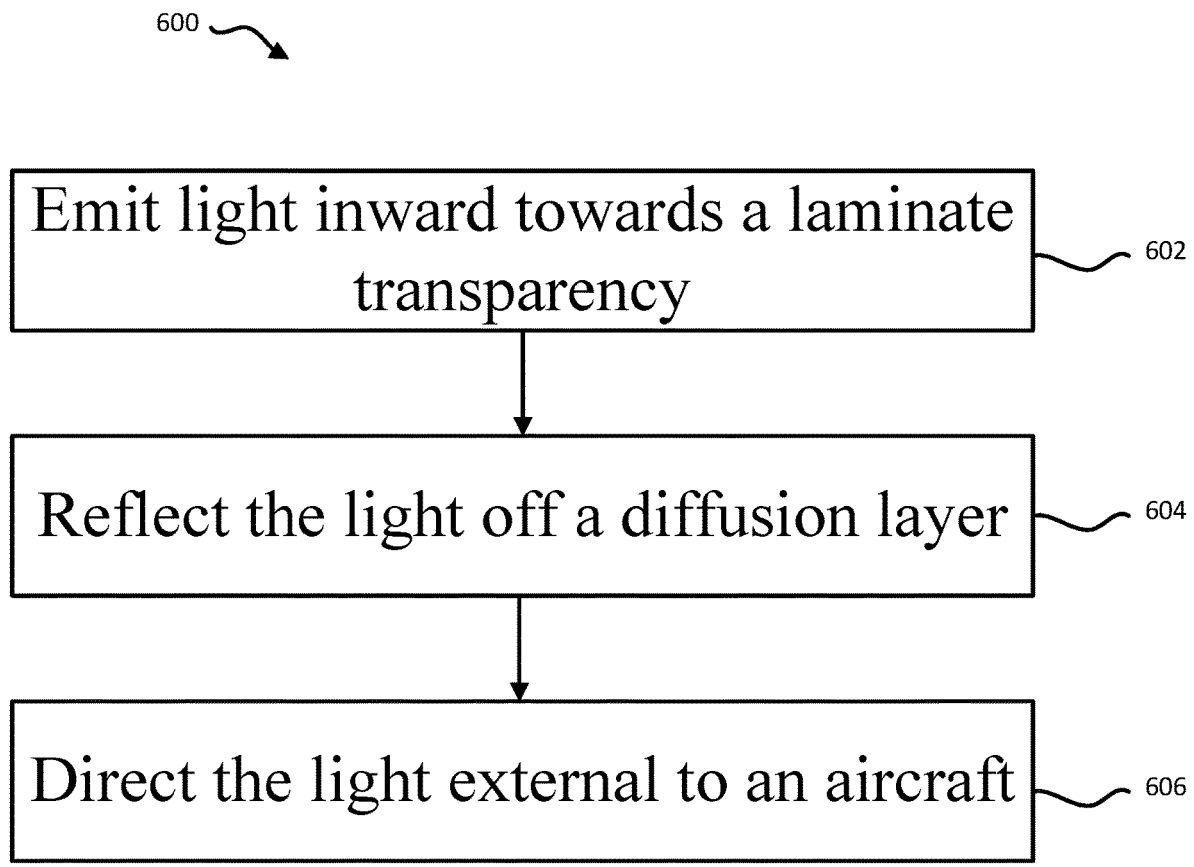
FIG. 6 illustrates a method of producing a halo effect on a halo light assembly for an aircraft, in accordance with various embodiments.

Referring now to FIG. 6, a method 600 of producing a halo effect on a halo light assembly 100 for an aircraft 10 is illustrated. The method may comprise emitting light inward towards a laminate transparency 140 (step 602). The laminate transparency 140 may comprise a first laminate layer 142, a second laminate layer 144 and a diffusion layer 146. The light may be emitted inward from an outer perimeter of the laminate transparency 140. The light may be directed into the second laminate layer 144. The second laminate layer 144 may be disposed between the first laminate layer 142 and the diffusion layer 146.

In various embodiments, the method 600 may further comprise reflecting the light off of the diffusion layer 146. The diffusion layer 146 may be a coating, an internal textured surface of the second laminate layer 144, or the like. The method 600 may further comprise directing the light external to an aircraft 10 (step 606). The light may be directed external to the aircraft over the length of the diffusion layer 146 disposed opposite an external surface 143 of the first laminate layer. The light may produce a halo effect around a perimeter of a halo light assembly 100.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A halo light assembly, comprising:
   a bevel including an aperture defining an inner surface;

a laminate transparency coupled to the bevel, the laminate transparency disposed in the aperture, the laminate transparency configured to abut the bevel, the laminate transparency including an internal surface, an external surface, and a diffusion layer, the diffusion layer disposed on the internal surface of the laminate transparency; and a light source coupled to the bevel and disposed adjacent to the laminate transparency, the light source extending around a perimeter of the laminate transparency, the light source oriented inward toward the laminate transparency.

2. The halo light assembly of claim 1, wherein the light source comprises a flexible strip and a plurality of lights.

3. The halo light assembly of claim 2, wherein the plurality of lights are embedded in the flexible strip.

4. The halo light assembly of claim 1, wherein the laminate transparency further comprises a first laminate layer and a second laminate layer, the second laminate layer disposed between the diffusion layer and the first laminate layer.

5. The halo light assembly of claim 4, wherein a second index of refraction of the second laminate layer is greater than a first index of refraction of the first laminate layer.

6. The halo light assembly of claim 4, wherein the light source is oriented towards the second laminate layer.

7. The halo light assembly of claim 4, further comprising a main light source, wherein the second laminate layer is disposed between the first laminate layer and the main light source.

8. The halo light assembly of claim 1, wherein the diffusion layer extends from an outer edge of the internal surface of the laminate transparency inward on the internal surface.

9. The halo light assembly of claim 1, wherein the diffusion layer extends around a perimeter of the halo light assembly on the internal surface of the laminate transparency.

10. An aircraft, comprising:
a fuselage;
a wing extending from the fuselage;
a halo light assembly disposed on at least one of the fuselage or the wing, the halo light assembly comprising:
a bevel including an aperture defining an inner surface;
a laminate transparency coupled to the bevel, the laminate transparency disposed in the aperture, the laminate transparency including an internal surface, an external surface, and a diffusion layer, the diffusion layer disposed on the internal surface of the laminate transparency;
a main light source disposed internal to the laminate transparency; and
a secondary light source coupled to the bevel and disposed adjacent to the laminate transparency, the secondary light source configured to produce a halo effect in the halo light assembly.

11. The aircraft of claim 10, wherein the secondary light source extends around a perimeter of the laminate transparency, the secondary light source oriented inward toward the laminate transparency.

12. The aircraft of claim 11, wherein the secondary light source comprises a flexible strip and a plurality of lights.

13. The aircraft of claim 12, wherein the plurality of lights are embedded in the flexible strip.

14. The aircraft of claim 10, wherein the diffusion layer comprises at least one of a textured surface or a diffusion paint.

15. The aircraft of claim 10, wherein the laminate transparency further comprises a first laminate layer and a second laminate layer, the second laminate layer disposed between the diffusion layer and the first laminate layer.

16. The aircraft of claim 15, wherein a second index of refraction of the second laminate layer is greater than a first index of refraction of the first laminate layer.

17. The aircraft of claim 16, wherein the secondary light source is oriented towards the second laminate layer.

18. The aircraft of claim 16, wherein the second laminate layer is disposed between the first laminate layer and the main light source.

* * * * *